(12) United States Patent
Bott et al.

(10) Patent No.: US 7,285,883 B2
(45) Date of Patent: Oct. 23, 2007

(54) DRIVE SYSTEM FOR LINEAR AND ROTARY MOVEMENTS

(75) Inventors: Erich Bott, Hollstadt (DE); Wolfgang Schneider, Fulda (DE); Holger Schunk, Lendershausen (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 231 days.

(21) Appl. No.: 10/856,347

(22) Filed: May 28, 2004

(65) Prior Publication Data

US 2004/0261553 A1 Dec. 30, 2004

(30) Foreign Application Priority Data

May 30, 2003 (DE) ................. 103 24 601

(51) Int. Cl.
*H02K 37/14* (2006.01)
*H02K 37/24* (2006.01)
*H02K 41/02* (2006.01)
*H02K 41/03* (2006.01)
*H02K 7/00* (2006.01)

(52) U.S. Cl. ............... 310/75 R; 310/12; 310/15; 310/75 A; 310/80; 310/84; 310/112

(58) Field of Classification Search .......... 310/75 R, 310/12, 15, 20, 80, 84, 75 A, 112
See application file for complete search history.

(56) References Cited

U.S. PATENT DOCUMENTS

| 4,767,958 | A | * | 8/1988 | Sasaki ................. 310/257 |
| 5,051,635 | A | * | 9/1991 | Kasahara ............. 310/80 |
| 5,818,118 | A | * | 10/1998 | Kimura et al. ........ 290/48 |
| 6,222,294 | B1 | * | 4/2001 | Stacy et al. .......... 310/112 |
| 6,734,582 | B2 | * | 5/2004 | Corbett et al. ........ 310/12 |
| 2001/0043016 | A1 | | 11/2001 | Chun et al. |

FOREIGN PATENT DOCUMENTS

EP 0875982 A1 * 4/1997

* cited by examiner

*Primary Examiner*—Tran Nguyen
(74) *Attorney, Agent, or Firm*—Henry M. Feiereisen

(57) ABSTRACT

A drive system includes a rotary drive unit for rotating a shaft and a linear drive unit for moving the shaft in a linear direction. To improve efficiency and shelf life, an energy storage is mechanically connected to the shaft for biasing the shaft to seek a linear movement in opposition to the linear direction. The energy storage absorbs the kinetic energy of the shaft and releases it again subsequently.

15 Claims, 3 Drawing Sheets

DRIVE SYSTEM FOR LINEAR AND ROTARY MOVEMENTS

CROSS-REFERENCES TO RELATED APPLICATIONS

This application claims the priority of German Patent Application, Serial No. 103 24 601.0, filed May 30, 2003, pursuant to 35 U.S.C. 119(a)-(d), the disclosure of which is incorporated herein by reference.

BACKGROUND OF THE INVENTION

The present invention relates, in general, to a drive system, and more particularly to a drive system of a type having a rotary drive unit for setting a shaft in rotation, and a linear drive unit for moving the shaft in a linear direction.

It would be desirable and advantageous to provide an improved drive system which obviates prior art shortcomings and which reduces energy consumption and has a long service life.

SUMMARY OF THE INVENTION

According to one aspect of the present invention, a drive system includes a rotary drive unit for rotating a shaft, a linear drive unit for moving the shaft in a linear direction, and an energy storage mechanically connected to the shaft for so biasing the shaft as to seek a linear movement in opposition to the linear direction.

The present invention resolves prior art problems by incorporating an energy storage which opposes the linear movement imposed by the linear drive unit on the shaft. A drive system according to the present invention is in particular applicable for printing machines which included heretofore mechanical drives with eccentrics and reversing gears for operating distributing rollers by which dye is transferred onto inking rollers. As the distributing rollers execute an oscillating axial movement at a frequency of about 5 HZ, the service life of incorporated ball bearings is significantly shortened by wear that leads to increased operating costs. The provision of a drive system according to the invention now allows easy control and adjustment, independence of movements, and requires no maintenance. The thus resultant greater efficiency is the result of the incorporated energy storage which stores brake energy during oscillating movement and releases the energy again so as to establish a resonance system.

According to another feature of the present invention, the rotary drive unit may include an electric motor. Also, the linear drive unit may include an electric linear motor.

According to another feature of the present invention, the energy storage for storing kinetic energy may include a magnetic spring, and/or an electric spring, and/or a mechanical spring, and/or a pneumatic spring. When a magnetic spring is involved, magnets are so disposed as to repel one another. An example of an electric spring includes two charged plates.

In the event, the drive system has a control unit that requires the provision of a rotary encoder to interact with the shaft for measuring a rotary position and/or a rotational speed of the shaft, a torque support is provided in accordance with the present invention to restrain the rotary encoder against rotation while permitting a linear movement of the rotary encoder. The torque support may be realized in a cost-efficient manner by a spiral spring having portions of radial cross sections with a main dimension extending in substantial parallel relationship to a plane of the spiral spring. The spiral spring has the required mechanical spring characteristics in axial direction to realize the desired torque support. In addition, the spiral spring is substantially free of maintenance and has a long shelf life. Compared to conventional ball bearings, the provision of a spiral spring is much cheaper and easier to implement.

Of course, the energy storage may be combined with the spiral spring as torque support for the rotary encoder. In other words, the spiral spring may be part of the energy storage.

In order to decouple the fixed stator member of the rotary encoder from the rotation of the shaft, it may be suitable to support the stator member upon the shaft through intervention of a bearing. Also, the linear drive unit may be supported upon the shaft by this bearing so as to prevent the linear drive unit to follow the rotation of the shaft.

According to another feature of the present invention, the spiral spring may be punched out from spring material such as a springy sheet metal. In this way, the spiral spring is ready for use without any further production steps.

As the spiral spring includes an axial recoil moment, the spiral spring may be used, when appropriately dimensioned, alone or in addition to other spring members as energy storage.

According to another aspect of the present invention, a drive system includes a rotary drive unit for rotating a shaft, a linear drive unit for moving the shaft in a linear direction, a rotary encoder interacting with the shaft for measuring a rotary position and/or a rotational speed of the shaft, and a torque support restraining the rotary encoder against rotation while permitting a linear movement of the rotary encoder, wherein the torque support includes a spiral spring having portions of radial cross sections with a main dimension extending in substantial parallel relationship to a plane of the spiral spring.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
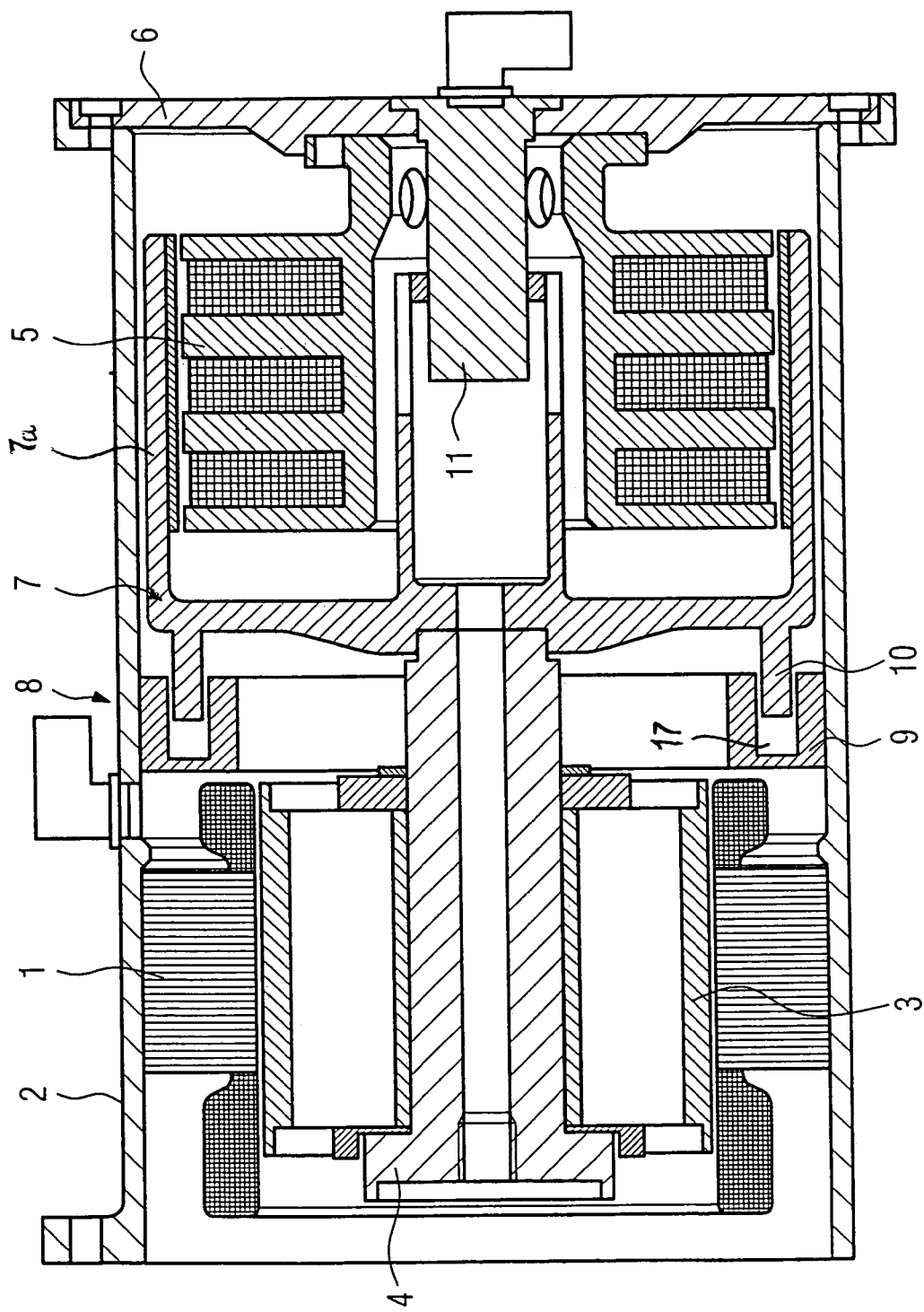
FIG. 1 is a cross sectional view of a first embodiment of a drive system according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross sectional view of a first embodiment of a drive system according to the present invention, including a rotary drive unit having a stator 1 which is mounted in a housing 2. Disposed radially inwards of the stator 1 is a rotor 3 which is mounted onto a shaft 4. As a result, the shaft 4 can be set in rotational movement.

The drive system further includes a linear drive unit having a stator 5 which is secured to the housing 2 via a cover 6. A cup 7 is securely mounted to the shaft 4 and has an axially extending outer wall 7a which is disposed between the stator 5 and the housing 2 for movement in an axial direction. In this way, the stator 5 moves the cup 7 in linear direction.

During rotational movement, the shaft 4 together with the cup 7 also executes an oscillating linear movement in axial direction. This linear movement is triggered by the stator 5 of the linear drive unit, whereby an energy storage 8 imposes a resilient action to reverse this linear movement. In the non-limiting example of FIG. 1, the energy storage 8 is connected in one piece with the cup 7. As shown in FIG. 1, the cup 7 is hereby formed with a ring-shaped projection 10 which juts out from the cup 7 in the direction of the electric motor, comprised of stator 1 and rotor 3, and protrudes into an annular groove 17 of a ring 9 resting against the housing 2. The ring 9 and the projection 10 are magnetized in opposite directions so as to repel one another. In the event the cup 7 is urged by the stator 5 in the direction of the ring 9, the magnetic repulsion slows down the linear movement and ultimately reverses the linear movement. The kinetic energy of the linear movement is thus stored and released again. A sensor 11 is secured to the cover 6 and extends inwardly toward the cup 7 to ascertain this linear movement or linear position for control of the drive system.

The drive system of FIG. 1 is capable to exploit the correlations between force and volume. The effective diameter of the linear drive unit, defined in the air gap between the stator 5 and the cup 7, is especially large as the moving cup 7 is disposed outwards and the stator 5 is disposed inwards.

Figure 2:
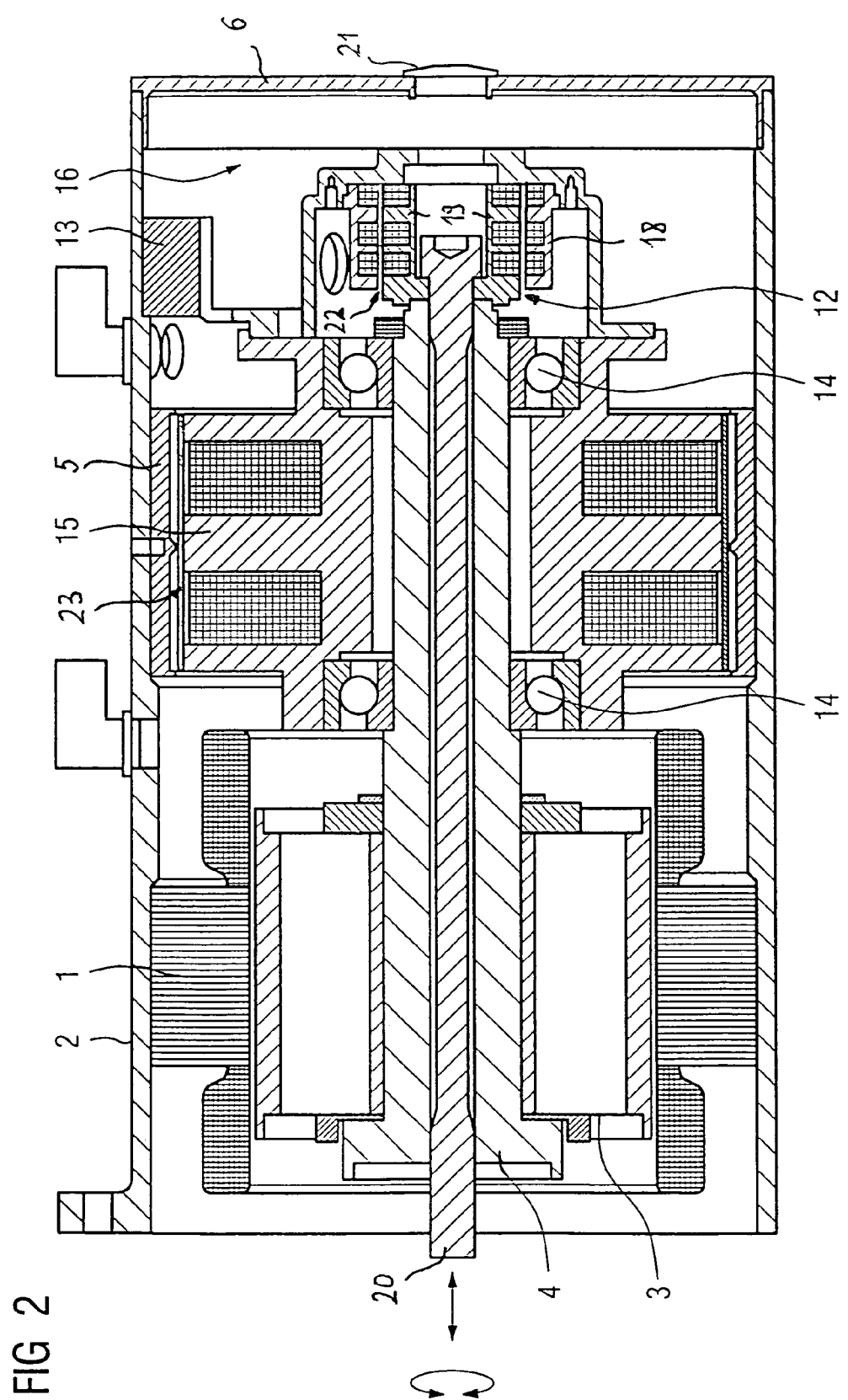
FIG. 2 is a cross sectional view of a second embodiment of a drive system according to the present invention.

Turning now to FIG. 2, there is shown a cross sectional view of a second embodiment of a drive system according to the present invention. Parts corresponding with those in FIG. 1 are denoted by identical reference numerals and not explained again. The description below will center on the differences between the embodiments. In this embodiment, provision is made for a control mechanism which requires a signal from a rotary encoder 12, and a signal from a linear encoder 13 which is mounted to the housing 2. The rotary encoder 12 includes a fixed stator member 18 and a rotor member 19 which is spaced from the stator member 18 by an air gap 22 and is mounted on the shaft 4.

The linear drive unit of the drive system of FIG. 2 includes a stator 5 and a rotor 15 which represents the moving member and is spaced from the stator 5 by air gap 23. In the non-limiting example of the drive system of FIG. 2, the cover 6 is secured via a rivet 21 to a rod (expansion screw) 20 fitted inside the shaft 4.

The rotary encoder 12 is provided for measuring a rotary position and/or a rotational speed of the shaft 4, independently from the linear movement. In order for the moving member 15 of the linear drive unit to carry out only a linear movement and thus to prevent the moving member 15 of the linear drive unit from rotating, bearings 14 are provided to support the moving member 15 and to absorb axial forces, and a torque support 16 (or linear guide) is arranged, which is shown in more detail in FIG. 3 and will be described in more detail furtherbelow. Determination of the rotational movement can be realized in principle also by supporting only the rotary encoder 12 via the bearings 14 upon the shaft 4. In this case, the moving member 15 of the linear motor is able to follow the rotational movement.

Decoupling of the movements results in a rotational movement without linear movement between the rotating and axially moving shaft 4 and the moving member 15 of the linear motor. The rotary encoder 12 which is moved conjointly with the shaft 4 in linear direction is thus able to easily ascertain the rotational movement for the rotating motor.

A linear movement without rotation is thus established between the housing 2 and the moving member 15 of the linear motor. This linear movement is detected by the linear encoder 13 and may be used for operating the linear motor.

Although not shown in detail, it is, of course, conceivable, to also provide the drive system of FIG. 2 with an energy storage 8, as described in connection with the drive system of FIG. 1. For sake of simplicity, an energy storage is, however, not depicted in FIG. 2.

Figure 3:
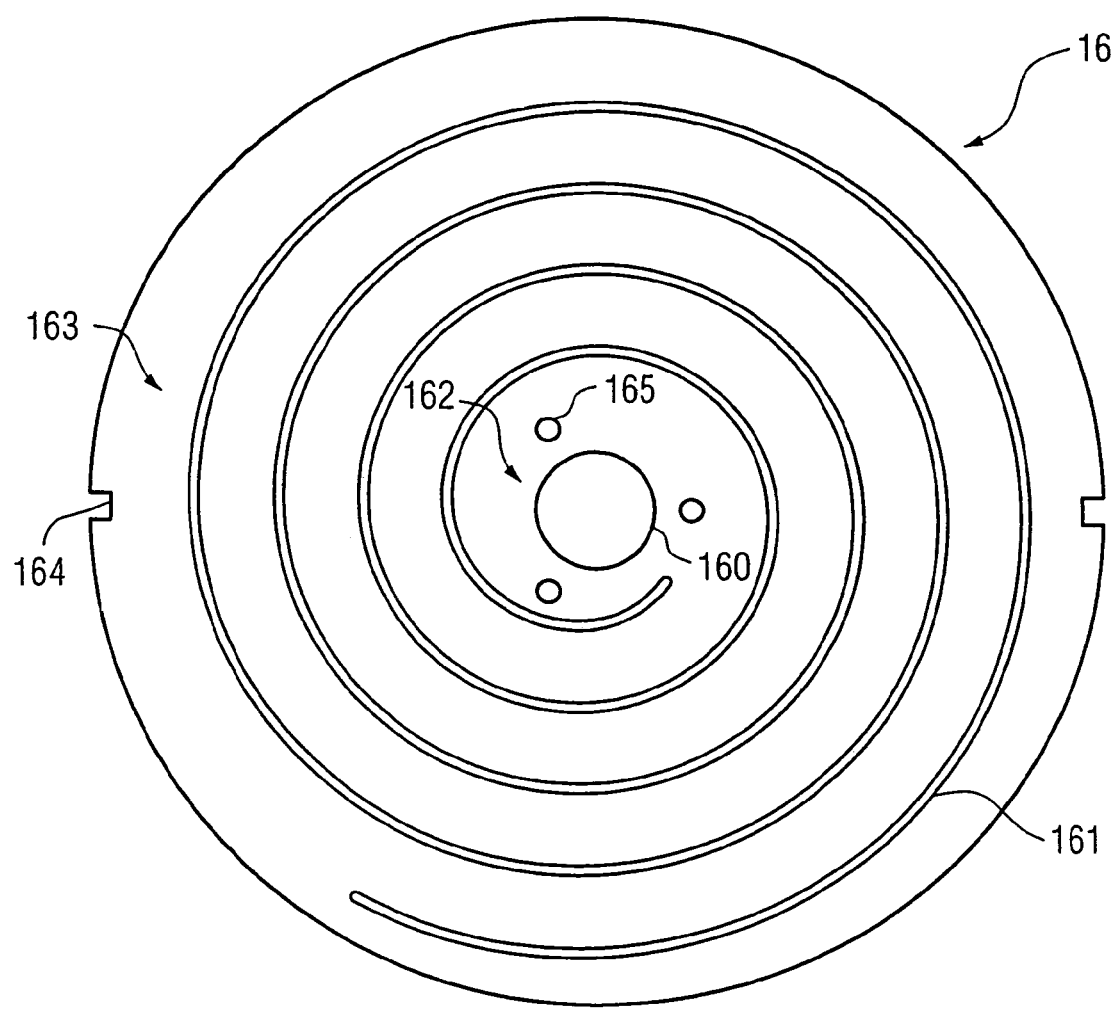
FIG. 3 is a plan view of a spiral spring of the drive system of FIG. 2 for use as torque support for a rotary encoder.

Referring now to FIG. 3, there is shown a more detailed illustration of an exemplified torque support 16. The torque support 16 is realized by a flat spiral spring which is punched out from a metal sheet of 1 mm thickness. In the non-limiting example of FIG. 3, the spiral spring 16 has a diameter of 245 mm and has a center portion 162 which is formed with a central hole 160 for passage of the shaft 4. The central hole 160 has here, by way of example, a diameter of 30 mm. The spiral spring 16 is further provided with a spiral punch-out slot 161 of a width of 2 mm to define spiral tracks spaced from one another in radial direction by 18 mm. The spiral slot 161 allows a movement of the central portion 162 in axial direction in relation to an outer portion 163 of the spiral spring 16 in response to a force perpendicular to the spiral plane. For reasons of stability, the slot 161 is sized to terminate before the central hole 160 and to terminate shy of the outer edge. Perforations 164 in the outer portion 163 secure the spiral spring 16 to the housing 2 and thereby restrain the spiral spring 16 in particular against rotation. The center portion 162 is formed with bores 165 for securement of the rotary encoder 12 and also the moving member 15 of the linear motor.

The configuration of the spiral spring 16 results in a soft deflection in axial direction so that unwanted forces on the attached structure are prevented. On the other hand, the spiral spring 16 is very stiff against loads in circumferential direction and thus remains flat in response to torsional forces. In this way, the spiral spring 16 satisfies the demands of a linear guide to allow only axial movements while preventing rotation. The spiral spring 16 is easy to make as punched part so that use of high-quality material becomes possible and a long shelf life is attained.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive system, comprising:
   a rotary drive unit for rotating a shaft;
   a linear drive unit for moving the shaft in a linear direction; and
   an energy storage mechanically connected to the shaft for so biasing the shaft as to seek a linear movement in opposition to the linear direction, wherein the energy storage includes a cup firmly mounted to the shaft and movable in the linear direction by the linear drive unit, said cup having a projection for engagement in a stationary ring-shaped member, wherein the projection and the ring-shaped are magnetized in opposite direction.

2. The drive system of claim 1, wherein the electric spring includes two charged plates.

3. The drive system of claim 1, wherein the energy storage includes a mechanical spring.

4. The drive system of claim 1, wherein the rotary drive unit includes an electric motor.

5. The drive system of claim 1, wherein the linear drive unit includes an electric linear motor.

6. A drive system, comprising:
   a rotary drive unit for rotating a shaft;
   a linear drive unit for moving the shaft in a linear direction; and
   an energy storage mechanically connected to the shaft for so biasing the shaft as to seek a linear movement in opposition to the linear direction, wherein the energy storage includes a magnetic spring.

7. The drive system of claim 6, wherein the rotary drive unit includes an electric motor.

8. The drive system of claim 6, wherein the linear drive unit includes an electric linear motor.

9. The drive system of claim 6, wherein the magnetic spring includes magnets so disposed as to repel one another.

10. A drive system, comprising:
    a rotary drive unit for rotating a shaft;
    a linear drive unit for moving the shaft in a linear direction; and
    an energy storage mechanically connected to the shaft for so biasing the shaft as to seek a linear movement in opposition to the linear direction, wherein the energy storage includes an electric spring.

11. The drive system of claim 10, wherein the rotary drive unit includes an electric motor.

12. The drive system of claim 10, wherein the linear drive unit includes an electric linear motor.

13. A drive system, comprising:
    a rotary drive unit for rotating a shaft;
    a linear drive unit for moving the shaft in a linear direction; and
    an energy storage mechanically connected to the shaft for so biasing the shaft as to seek a linear movement in opposition to the linear direction, wherein the energy storage includes a pneumatic spring.

14. The drive system of claim 13, wherein the rotary drive unit includes an electric motor.

15. The drive system of claim 13, wherein the linear drive unit includes an electric linear motor.

* * * * *